Aug. 25, 1964   W. W. BLEDSOE   3,145,424
ROLLER GIN AND METHOD OF GINNING COTTON
Filed Nov. 23, 1960   4 Sheets-Sheet 3
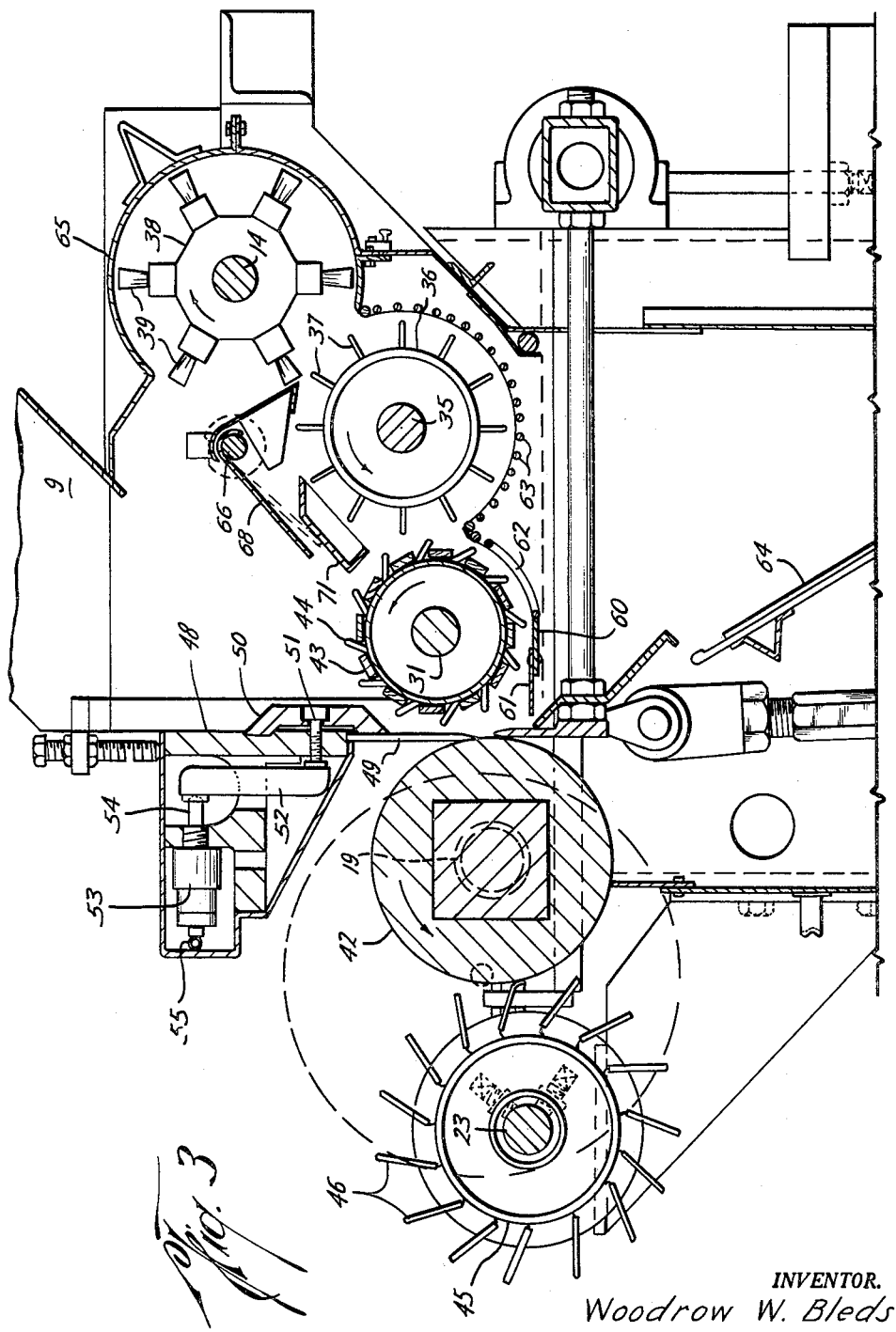
INVENTOR.
Woodrow W. Bledsoe
BY
Bertram H. Mann
ATTORNEY

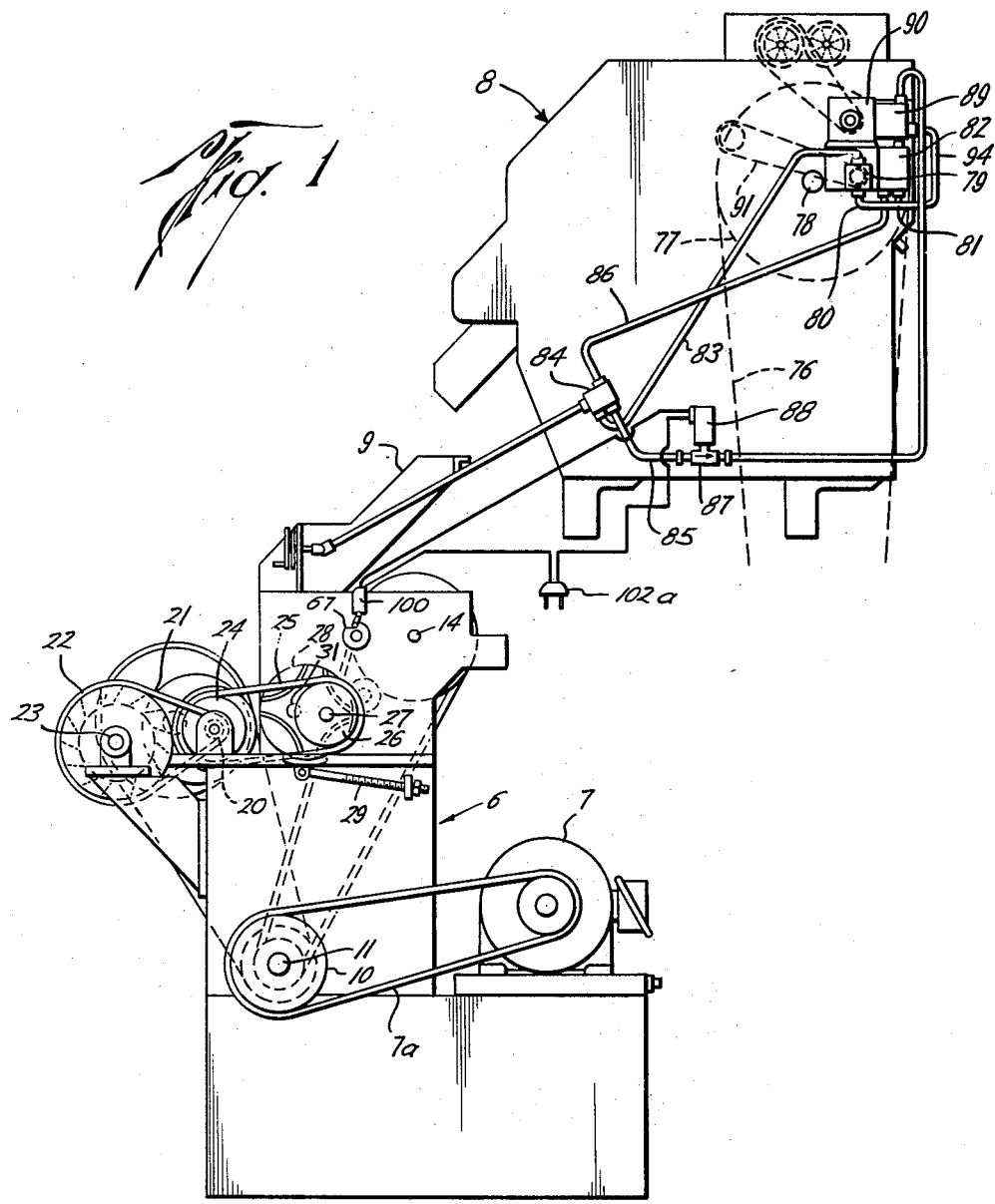

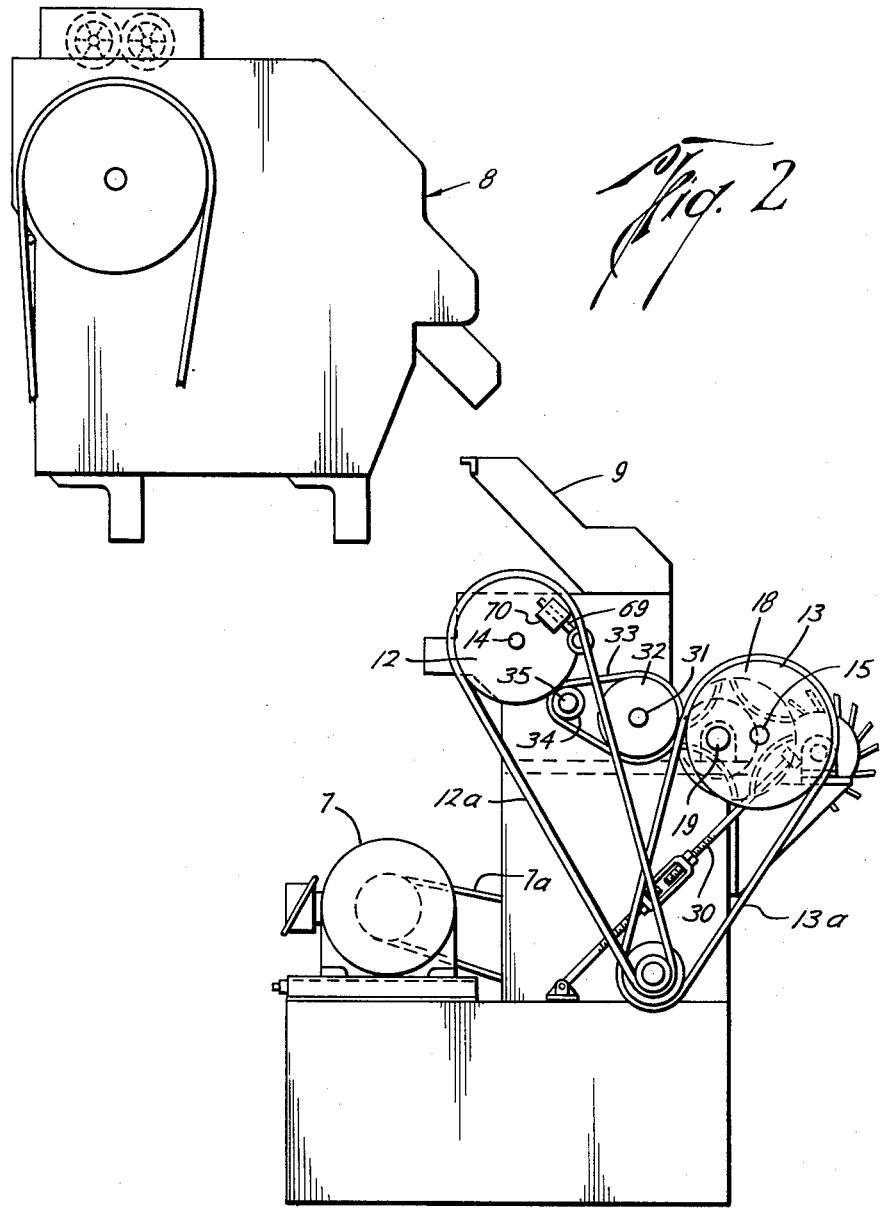

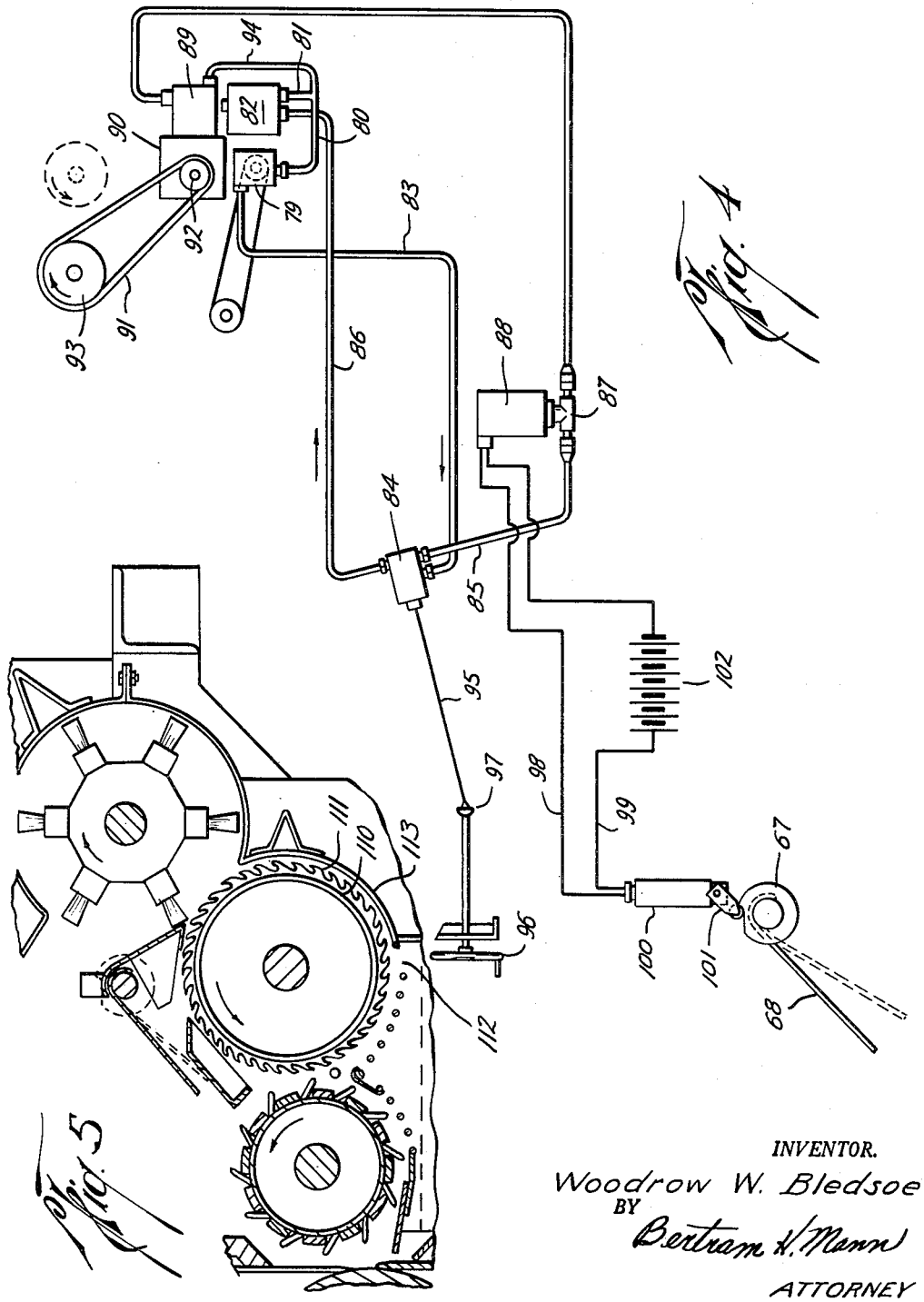

United States Patent Office 3,145,424
Patented Aug. 25, 1964

3,145,424
ROLLER GIN AND METHOD OF GINNING COTTON
Woodrow W. Bledsoe, Mesquite, Tex., assignor to The Murray Company of Texas, Inc., Dallas, Tex., a corporation of Delaware
Filed Nov. 23, 1960, Ser. No. 71,218
10 Claims. (Cl. 19—52)

This invention relates to cotton gins of the roller type and consists particularly in novel, simplified construction of seed releasing, cotton reclaiming, and feed means therefor. This application is a continuation-in-part of my application Serial No. 27,561, filed May 9, 1960, now abandoned.

In previous roller gins, it has been customary to feed the initially cleaned and combed cotton to the ginning roller and knives by means of a draper feeder which delivers the cotton in a fairly uniform mat. The released seeds and cotton which do not adhere to the ginning roller are collected upon an agitated grid which permits the seeds to escape, while the cotton is redelivered to the ginning roller by a reciprocating pusher board which slides across the grid. With this arrangement it has been necessary to vary the grid, particularly the interstices thereof, in accordance with the size of the cotton seeds being handled. Moreover, the rate of feed to the gin must be controlled by the operator to insure most efficient operation.

Furthermore, where the cotton has fuzzy seeds, these tend to mat or bunch with each other and the cotton rejected or uncaught by the ginning roller and knives. Consequently, such seed may be carried with the cotton returned to the ginning roller and knives and tends to clog the feed mechanism and retard or stop the feeding of fresh seed cotton to the roller.

An important object of the present invention is to provide a substantially simplified feed means for a roller gin.

Another object is to provide feed means which avoids the necessity of providing a shaking or agitated seed releasing grid.

Another object is to avoid the necessity of changing the seed grid to conform with the seed sizes being handled.

Another object is to provide improved feed means for a roller gin in which the cotton initially rejected by the ginning roller and knives is passed above a fixed seed grating, through which the seeds are permitted to escape, and which effectively redelivers such cotton to the ginning roller and blades.

Another object is to provide a roller gin having improved supplementary means for separating seeds from the cotton carried away from the ginning roller for representation to the roller.

Still another object is to provide novel means for adjusting the rate of delivery of cotton to a roller gin in accordance with the rate of processing of the cotton by the gin.

These objects and other more detailed objects hereafter appearing are attained by my novel roller gin construction which consists, generally, of a delivery chute for delivering cotton to the feed and ginning rollers, powered mechanism for delivering cotton to the chute, and a resiliently-mounted, pressure-sensitive vane which is shifted when the pressure or packing of the cotton in the chute becomes excessive to reduce the delivery rate of cotton to the chute. The novel reclaiming means comprises a first spiked roller for catching cotton rejected by the roller and knives and carrying the same and the separated seeds away from the ginning roller. A stationary grating beneath the spiked roller releases seeds which drop. A second spiked roller, traveling at a relatively high rate of speed catches bunches of seed and cotton not separated and subjects them to agitation and centrifugal action which effectively disperses the entrained seeds. The remaining cotton is then doffed and returned to the feed and ginning roller.

In the accompanying drawings which illustrate the invention,

FIG. 1 is a side view of the novel roller gin and delivery mechanism;

FIG. 2 is an elevation showing the opposite side of the gin;

FIG. 3 is an enlarged, vertical transverse sectional view through the gin;

FIG. 4 is a schematic representation of the means for adjusting the rate of delivery of cotton; and FIG. 5 is a partial sectional view similar to FIG. 3, but showing a modification.

FIGS. 1, 2 and 3 illustrate the roller gin unit, generally indicated at 6, upon which is mounted the electric motor 7, and the unit 8 for initially cleaning the cotton and delivering the same to the feed chute 9 at the top of the roller gin unit. Belt drive 7a is provided from motor 7 to a sheave wheel 10 on a countershaft 11 and thence belts 12a and 13a (FIG. 2) extend to the sheave wheels 12 and 13 on gin unit drive shafts 14 and 15. Drive shaft 15 constitutes the input shaft of a shaft-mounted gear reduction box 18 (FIG. 2), the output shaft 19 of the box being journalled in the machine frame and mounting a small sheave 20 at its opposite end (FIG. 1). This sheave is connected by means of a belt 21 to a driven wheel 22 which operates doffing roller shaft 23. An additional sheave 24 on driven shaft 19 is connected by means of a belt 25 and sheave 26 to the input shaft 27 of a second shaft-mounted gear reduction box 28 of the same type as box 18. A reaction rod 29 is provided for gear box 28 and a reaction rod 30 is provided for box 18, these serving to tension their respective drive belts 25 and 13a. The output shaft 31 for box 28 (FIG. 1) has a sprocket wheel 32 rigid with the opposite end thereof (FIG. 2) and connected by means of a drive chain 33 and second sprocket 34 to shaft 35 which mounts the separator type reclaimer cylinder 36 (FIG. 3). Cylinder 36 has radial spikes 37 arranged along its length.

Rigidly mounted on previously mentioned driven shaft 14 is a cylinder 38 mounting reclaimer brushes 39, as shown. Mounted on output shaft 19 of gear box 18 is the ginning roller 42 (FIG. 3). The feed (picker) roller 43 with projecting prongs 44 is mounted on output shaft 31 of gear box 28 and parallels roller 42 at a slight distance therefrom inwardly of the machine. The doffing roller 45, having flexible rubber wings 46, is mounted on previously mentioned shaft 23 and parallels the ginning roller at a slight distance outwardly therefrom.

Mounted on a bar 48 above and between ginning roller 42 and feed roller 43 is the stationary knife 49, the lower edge of which is resiliently urged against the face of the ginning roller by means of clips 50. Hydraulic mechanism including reach pins 51, pivoted levers 52, and hydraulic cylinders 53 and piston rods 54 applies yielding, leftward pressure (FIG. 3) to clips 50 to apply uniform retaining force to and along knife 49, tending to maintain the edge of the knife in tangential engagement with the ginning roller. Hydraulic connections are indicated at 55. This hydraulic adjusting mechanism for the stationary knife is more fully disclosed and claimed in a Patent No. 2,955,328 in the name of Joseph C. Neitzel. The movable knife 56 is reciprocated relative to the stationary knife, as is well known, to pull the seeds loose from the fibers.

Extending transversely of the feed roller and below the same is a guide baffle 60, having an extension 61, for directing cotton adhering to the feed roller around the roller and maintaining the same in the vicinity thereof.

Forming an extension of baffle 60 around roller 43 are the grid-forming, circumferential bars 62. Additional transverse grid bars 63 extend substantially 180° around the forward, lower, and rear portions of separator cylinder 36. The fixed grid formed by bars 62 and 63 serves for dropping released seeds into the hopper 64. A curved wall 65 encompasses brush 38, 39.

Extending transversely of the machine somewhat above separator cylinder 36 and forwardly of the reclaimer brush is a journalled shaft 66 which rigidly mounts a cam 67 at one end thereof (FIGS. 1 and 4). Extending downwardly and leftwardly from shaft 66 (FIG. 3), within the portion of the unit casing forming an extension of chute 9, is a feed control vane 68. On the end of shaft 66 opposite cam 67 (FIG. 2) there is rigidly mounted a radial arm 69 carrying an adjustable counterweight 70, which normally maintains the vane in the solid line position of FIGS. 3 and 4. A stop bracket 71 between vane 68 and the separator cylinder limits oscillation of the vane 68 in position for directing cotton reclaimed by the brush cylinder over shaft 66 to return the same to the delivery chute and feed roller.

Delivery unit 8 (FIGS. 1 and 2), preferably, is driven from an independent source by means of belt 76 operating a pulley 77 on drive shaft 78. Suitable gearing (not shown) connects shaft 78 to a pump 79 for providing hydraulic pressure to operate the feed unit. The pump draws fluid through a pipe 80 and T-fitting 81 from an oil tank 82 mounted adjacent the pump (FIG. 4). The output of the hydraulic pump passes through piping 83 and a 3-way valve 84 to alternative delivery pipes 85 and 86. Pipe 85 leads past a normally open valve 87 controlled by a solenoid 88 to a hydraulic motor 89 shown mounted slightly above tank 82 and acting through a gear reducer 90. Hydraulic fluid is returned from the motor to the pump through a pipe 94. A belt 91, pulley 92, and other gearing (not shown) operate the feed unit, including the primary feed wheels 93.

Delivery pipe 86 leading from 3-way valve 84 returns the pumped liquid to tank 82. Three-way valve 84 is manually controlled by means of a rotating shaft 95 and handle crank 96 connected through a universal joint 97. There is also incorporated in valve structure 84 a pressure limiting valve means which functions to relieve excess pressure in delivery line 83, as when valve 87 is closed, through return line 86.

Solenoid 88, previously mentioned, is connected by electrical wires 98 and 99 to a limit switch 100 whose actuator 101 rides on the periphery of cam 67 which is controlled by resiliently-mounted, pressure-responsive vane 68. Interposed in wire 99 is a source of electric current, represented in FIG. 4 by the battery 102 and in FIG. 1 by the connector plug 102a conveniently for 110 volt, 60 cycle current. Limit switch 100 is normally open in the solid line positions of vane 68 and cam 67 shown in FIGS. 3 and 4. However, in case the pressure of cotton on the control vane is sufficient to shift the vane counterclockwise, switch 100 is closed so as to energize solenoid 88 and close the normally open valve 87 to stop motor 89 and the feed unit.

In operation, the action of delivery unit 8 and, consequently, its rate of feeding of cotton to the gin unit, is manually controlled through handle crank 96 to insure optimum operation of the roller gin. Control vane 68 is adjusted to remain in its undeflected position, as shown in solid lines in FIG. 3, as long as the gin is operating normally and consuming all of the cotton supplied by the delivery unit. However, in case cotton should be delivered by unit 8 at an excessive rate, causing the cotton to accumulate within the delivery chute, the increased pressure thereof applied to vane 68, ultimately, will deflect the vane against stop 71. This, in turn, will shift cam 67 and close limit switch 100 so as to activate solenoid 88 to close valve 87 to stop delivery of cotton.

During normal operation of the roller gin unit, cotton from the delivery chute is delivered by feed roller 43 to the face of ginning roller 42 abreast stationary knife 49 and movable knife 56. These elements act in the customary manner to release seeds from the cotton fibers caught between the stationary knife and the ginning roller. Any cotton adhering to the feed roller is carried by prongs 44 thereon around the roller, being held in proximity thereof by guide baffle 60 with extension 61 and spaced rods 62 and 63 forming a fixed grid or screen for dropping the released seeds into the collecting bin 64.

Cotton and seeds carried around with the feed roller are caught by spiked separator roller 36 which rotates at a relatively high rate, say 360 r.p.m. The resultant agitation, flagellation, and subjection to centrifugal force of the caught material causes forceful separation of seeds from each other and much of the adhering linters. This separation step is particularly important in the case of cotton having fuzzy seeds which tend to bunch beneath and in front of the feed roller. The separated seeds drop through gratings 62 and 63 into hopper 64. The freed linters, then, are doffed by reclaiming brush 38, 39 which rotates somewhat faster than cylinder 36 and throws them over control vane shaft 66 and back into chute space 9 to rejoin the incoming cotton on its way to the feed roller.

Thus, the usual agitated, seed-release grid is eliminated and, moreover, due to the reclaiming means, it is not necessary to provide for replacing the seed release grid in accordance with the size of the seeds being processed. The automatic feed control insures the most efficient operation of the gin with less supervision than heretofore required. The centrifugal separator 36 effectively breaks up and separates bunches of seed and cotton which may escape from the ginning roller so that substantially no seed is returned to the feed hopper.

In the form in FIG. 5, a saw cylinder 110 is substituted for spiked separator cylinder 36 in FIG. 3. This form is intended for use with cotton having smooth or slick seeds from which the fibers are completely removed by the ginning roller and knives. Roller 110 has annular sets of saw teeth 111 arranged therealong and travels at a relatively slow rate, say 30–40 r.p.m. Linters carried along by the saw teeth are doffed by brush 38 and redelivered to the feed roller, as in the previous form, while released seeds drop through transverse gratings 62a and 63a into the hopper. A larger space 112 at the end of the gratings provides for release of large seeds. A curved wall 113 passes around and encloses the rear wall of saw cylinder 110.

The invention may be modified in various respects as will occur to those skilled in the art, and the exclusive use of all modifications as come within the scope of the appended claims is contemplated.

I claim:

1. In a roller gin, a ginning roller with cooperating knives, a feed roller for directing seed cotton against said roller and for carrying rejected fibers and seed away from said roller, a rotating device for receiving said fibers and rejected seeds from said feed roller, means for rotating said device at a sufficiently rapid rate to subject said rejected seeds and fibers to centrifugal separation, and means to return the separated fibers from said device to said feed and ginning rollers.

2. In a roller gin, a ginning roller and cooperating knives, a picker roller abreast said ginning roller for delivering seed cotton thereto and carrying rejected material therefrom, a spiked reclaimer roller adjacent said picker roller for receiving said rejected material therefrom and subjecting the same to agitation and centrifugal forces to cause the throwing off and separation of entrained seeds, and means to return cotton caught by said separator to said picker and ginning rollers.

3. A roller gin as described in claim 2 further including grating means extending beneath said picker and reclaimer rollers for releasing seed dropped thereonto while retaining entrained cotton in the vicinity of said latter rollers.

4. The combination with a roller gin having a feed chute, a ginning roller, and cooperating knife means abreast of a part of said roller, of a pronged feed roller positioned to receive cotton from said chute and to direct the cotton against said part of said ginning roller and retain material rejected by said ginning roller, means adjacent said feed roller for segregating released seeds, means to remove from said feed roller cotton adhering thereto, and means to return the removed cotton to said chute at a point spaced substantially from said feed roller.

5. In a roller gin, a ginning roller, a feed roller abreast the same, a stationary grating beneath said feed roller for permitting the escape of released seeds while confining cotton carried away from said ginning roller to the immediate vicinity of said feed roller, a reclaiming roller adjacent said feed roller for removing from said feed roller cotton adhering thereto, a feed chute for delivering cotton to said feed roller, and doffing means located between said reclaiming roller and a portion of said chute spaced substantially from said feed roller for releasing cotton from said reclaiming roller and returning the same to said chute and thence to said feed roller.

6. In a roller gin, a ginning roller, a feed roller abreast the same, a stationary grating beneath said feed roller for permitting the escape of released seeds while confining cotton carried away from said ginning roller to the immediate vicinity of said feed roller, a reclaiming roller adjacent said feed roller for removing from said feed roller cotton adhering thereto, means for rotating said reclaiming roller at a speed sufficient to separate lumped seed by centrifugal force, a feed chute for delivering cotton to said feed roller, and doffing means located between said reclaiming roller and a portion of said chute spaced substantially from said feed roller for releasing cotton from said reclaiming roller and returning the same to said chute and then to said feed roller.

7. The combination of claim 6 wherein another stationary grating is disposed adjacent and beneath said reclaiming roller.

8. The combination of claim 6 wherein said rotating means rotates said reclaiming roller at a speed of at least 360 r.p.m.

9. The combination with a roller gin having a feed chute, a ginning roller, and cooperating knife means abreast of a part of said roller, of a pronged feed roller positioned to receive cotton from said chute and to direct the cotton against said part of said ginning roller and retain material rejected by said ginning roller, grating means adjacent said feed roller for segregating released seeds, means to remove from said feed roller cotton adhering thereto, and means to return the removed cotton to said chute at a point spaced substantially from said feed roller.

10. A method of processing cotton wherein the cotton is fed into a chute, said method comprising the steps of ginning the cotton by subjecting the cotton to a feed roller and feeding a portion thereof to a ginning roller with the remaining portion thereof being urged away from the ginning roller with freed seed in the remaining portion of the cotton being separated therefrom by gravitational forces acting thereon, thereafter feeding the remaining portion of the cotton to a rotating zone whereat the remaining portion of the cotton is subjected to beating and centrifugal action for separating bunched fuzzy seeds, and thereafter doffing the centrifuged separated seeds and returning same to a location which is upstream of the feed roller.

References Cited in the file of this patent
UNITED STATES PATENTS

| | | |
|---|---|---|
| 619,425 | Marsden | Feb. 14, 1899 |
| 655,167 | Prior | July 31, 1900 |
| 1,710,061 | Mitchell et al. | Apr. 23, 1929 |
| 1,770,544 | Mitchell | July 15, 1930 |
| 1,823,135 | Elliott | Sept. 15, 1931 |
| 2,113,988 | Kershaw | Apr. 12, 1938 |
| 2,180,761 | Meier | Nov. 21, 1939 |
| 2,815,537 | Bryant | Dec. 10, 1957 |
| 2,862,247 | Vandergriff | Dec. 2, 1958 |
| 2,994,926 | Deems | Aug. 8, 1961 |